United States Patent [19]

Hert et al.

[11] Patent Number: 5,266,626
[45] Date of Patent: Nov. 30, 1993

[54] THERMOPLASTIC ELASTOMER BASED ON AN ETHYLENE/α-OLEFIN COPOLYMER AND ON POLYNORBORNENE

[75] Inventors: Marius Hert, Verneuil-en-Halatte; Christian Dousson, Nogent-sur-Oise; Guy Maindron, Angicourt, all of France

[73] Assignee: Norsolor, Paris, France

[21] Appl. No.: 988,004

[22] Filed: Dec. 9, 1992

Related U.S. Application Data

[63] Continuation of Ser. No. 598,657, Dec. 21, 1990, abandoned.

[30] Foreign Application Priority Data

Feb. 22, 1989 [FR] France ................ 89 02304
Apr. 28, 1989 [FR] France ................ 89 05729
Jan. 30, 1990 [FR] France ................ 90 01064

[51] Int. Cl.$^5$ ............................................. C08L 45/00
[52] U.S. Cl. ................................. 524/518; 524/527; 524/528; 524/445; 524/447; 524/451
[58] Field of Search ................ 524/518, 527, 528

[56] References Cited

U.S. PATENT DOCUMENTS

| | | | |
|---|---|---|---|
| 4,141,878 | 2/1978 | Coran et al. | 525/240 |
| 4,203,884 | 5/1980 | Coran et al. | 524/518 |
| 4,605,285 | 8/1986 | Fujiwara et al. | |
| 4,822,855 | 4/1989 | Kobayashi et al. | |

FOREIGN PATENT DOCUMENTS 241217 10/1987 European Pat. Off. .
0256724 2/1988 European Pat. Off. .
2735360 2/1979 Fed. Rep. of Germany .

OTHER PUBLICATIONS

B. Scrosati, "Electrochromism and Electrochromic Devices," Chimica Oggi, Jun. 1989, pp. 45–47.
Supplementary European Search Report, Application No. EP 90 91 1047, Jun. 26, 1992.

*Primary Examiner*—Melvin I. Marquis
*Assistant Examiner*—Mark Sweet
*Attorney, Agent, or Firm*—Finnegan, Henderson, Farabow, Garrett & Dunner

[57] ABSTRACT

Composition comprising a mixture from 20 to 70 parts by weight of polynorbornene, from 80 to 30 parts by weight of crystalline polyolefine and a quantity of plastifier for the polynorbornene sufficient to lower its glass transition temperature down to the range of rubbers, characterized in that, a copolymer of ethylene and at least one α-olefine having from 3 to 10 carbon atoms is used as crystalline polyolefine, said copolymer having a density between 0.89 and 0.93, a crystallinity ratio between 15 and 50% and a fluidity index between 0.5 and 15 dg/min. Such compositions are used to fabricate finished products and industrial articles by using the techniques of extrusion, injection moulding and compression moulding. Particular applications are flexible pipes, joints for the building and car industries, protection bellows for the car industry, injected articles.

22 Claims, No Drawings

THERMOPLASTIC ELASTOMER BASED ON AN ETHYLENE/α-OLEFIN COPOLYMER AND ON POLYNORBORNENE

This application is a continuation of application Ser. No. 7/598,657 filed Dec. 21, 1990, now abandoned.

The present invention relates to thermoplastic compositions and more specifically to thermoplastic elastomer compositions comprising mixtures of an ethylene/α-olefin copolymer and polynorbornene.

Polymers of relatively high molecular weight are in general incompatible with one another. When two polymers of different nature are mixed, their mixture has in general poor mechanical properties, such as rupture strength and elongation at break. A pair of polymers is rarely sufficiently compatible to form a mixture having mechanical properties which are as good as those of the one showing poorer performance. However, when two polymers are compatible, the resulting mixture can have an advantageous combination of properties, i.e., apart from good mechanical property(sic), it can also have other favorable characteristic features.

Thus, the U.S. Pat. No. 4,203,884 teaches that compositions comprising a mixture of a crystalline thermoplastic polyolefin, polynorbornene and a quantity of plasticizer for polynorbornene sufficient for lowering its glass-transition temperature down to the range of rubbers have advantageous properties. More specifically, this document discloses compositions comprising a mixture of 75 to 10 parts by weight of polyolefin, 25 to 90 parts by weight of polynorbornene and, per 100 parts by weight of polynorbornene, 30 to 400 parts by weight of plasticizer, said compositions being elastoplastic, i.e. they have elastomeric properties while, at the same time, they can be processed like thermoplastics. In the molten state, a portion of the plasticizer can be present, according to this technique, in the thermoplastic polyolefin phase. After cooling, the plasticizer migrates to a large extent from the crystalline polyolefin phase towards the polynorbornene phase and becomes part of the latter. In this manner, the plasticizer improves the thermoplasticity or application range of the composition. As a general rule, at a given degree of thermoplasticity, the greater the amount of plasticizer the less the amount of polyolefin required.

The Pat. U.S. Pat. No. 4,203,884 likewise discloses compositions comprising a mixture of 10 to 90 parts by weight of crystalline polyolefin and 90 to 10 parts by weight of crosslinked polynorbornene dispersed in the form of small-sized particles, and plasticizer in an amount sufficiently high for lowering the glass-transition temperature of polynorbornene down to the range of rubbers. Thus, the crosslinking of polynorbornene improves the balance between the properties of the composition, in particular the rupture strength, the solvent stability and the high-temperature properties. Compositions of this type are obtained by a dynamic vulcanization process, according to which a mixture of polynorbornene, plasticizer, polyolefin, and crosslinking agents is kneaded at a temperature sufficiently high for crosslinking polynorbornene.

Of the crystalline thermoplastic polyolefins usable according to the U.S. Pat. No. 4,203,884, polyethylene and polypropylene may be mentioned, the latter being preferred as shown by comparing the results illustrated by Tables 1 and 2 of the document cited. Indeed, this document teaches that compositions comprising 30 to 60 parts by weight of crosslinked polynorbornene and 70 to 40 parts by weight of a polyethylene of density 0.960 g/cm$^3$ have:

- a modulus of 100% elongation of at least 6.8 MPa, i.e. too high, and
- an elongation at break not exceeding 220%, i.e. too low for most applications of thermoplastic elastomers.

The experiments of the applicant company have furthermore shown that these same compositions have a compression set which is too high and a Shore A hardness which is too high for most applications of thermoplastic elastomers.

The first problem that the present invention aims to solve accordingly consists in choosing from the broad range of ethylene polymers a polymer which is capable of giving an elastoplastic composition based on polynorbornene and plasticizer, and a balance between advantageous properties, thus making it suitable for most applications of thermoplastic elastomers and in particular:

- a Shore A hardness not exceeding about 65,
- an elongation at break which is not less than 250%,
- a modulus of 100% elongation which is not higher than about 6 MPa and is preferably not higher than about 3 MPa, and
- a compression set at 70° C. over a period of 22 hours according to ASTM Standard D 395 not exceeding 45%.

The Applicant has proven that this goal can be achieved by using an ethylene/α-olefin copolymer and by choosing the characteristic parameters of this copolymer from within narrow.

Furthermore, the formulated and vulcanized polynorbornene is a rubber which is rather sensitive to thermal degradation as a result of its high degree of unsaturation. When the vulcanization system used is based on sulfur, it leads to bridges with sulfur-sulfur bonds which make the vulcanized polynorbornene even more fragile with respect to temperature. Thus, it is known that rubbers formulated from polynorbornene in general lose the greater part of their mechanical properties (especially rupture strength and elongation at break) after aging at temperatures above 80° C for an extended period of time.

Some solutions have already been proposed for improving the thermal aging resistance of rubbers formulated on the basis of polynorbornene. Of these solutions, especially the addition of at least one antioxidant of the phenolic type or, alternatively, one such as the zinc salt of mercaptobenzoimidazole, to the rubber formulated, may be mentioned. The use of reactive compounds capable of forming carbon-oxygen or carbon-carbon bonds may also be mentioned; such as phenolic resins in general associated with accelerating compounds, such as Lewis acids or certain metal oxides (in particular those of zinc and magnesium). An example of such a reactive system is the combination of stannic chloride with a phenolic resin of the formula:

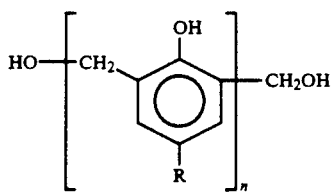

in which n is 4 or 5 and R denotes an alkyl radical. The abovementioned solutions for improving the thermal aging resistance of rubbers formulated on the basis of polynorbornene can, of course, be combined so as to enhance their effects. Nevertheless, even in this case, it is in general observed that said rubbers lose more than 80% of their rupture strength after aging at 100° C. for 7 days and lose all of their mechanical properties (rupture strength and elongation at break) after 14 days of aging at 100° C. It is quite obvious that this state of affairs puts a restraint on the use of rubbers formulated on the basis of polynorbornene in a certain number of applications.

The second problem that the present invention aims to resolve accordingly consists in developing an efficient means for improving the thermal aging resistance of rubbers formulated on the basis of polynorbornene and in particular for maintaining the greater part of their mechanical properties after aging at temperatures above 80° C. for an extended period of time.

The present invention first relates to a composition comprising a mixture of about 20 to 70 parts by weight of polynorbornene, about 80 to 30 parts by weight of a crystalline polyolefin and a quantity of plasticizer for polynorbornene sufficient for lowering the glass-transition temperature down to the range of rubbers, characterized in that the crystalline polyolefin chosen is a copolymer of ethylene and of at least one α-olefin having 3 to 10 carbon atoms, said copolymer having a relative density between about 0.89 and 0.93, a degree of crystallinity between about 15 and 50% and a flow index between about 0.5 and 15 dg/min. Copolymers of this type are quite familiar to one skilled in the art and can be prepared by various processes, either under reduced pressure and at moderate temperature, or under super elevated pressure and elevated temperature. In accordance with the range of density indicated, their molar α-olefin content is in general between about 1 and 10%, depending on the nature of the α-olefin. Of the α-olefins which can be incorporated in the structure of these copolymers, in particular propylene, 1-butene, 1-hexene, 4-methyl-1-pentene and 1-octene are mentioned. Of the ethylene/α-olefin copolymers usable according to the present invention, advantageously ethylene/propylene/1-butene terpolymers are preferred, and also ethylene and higher α-olefin copolymers (i.e. those having at least 4 carbon atoms), in accordance with European Patent No. 070,220. The latter are copolymers of particularly pronounced macromolecular heterogeneity, i.e. the α-olefin content therein can vary considerably, depending on the crystalline or amorphous fractions in which it is measured, from the average α-olefin content in the copolymer. In certain copolymers of this type, the heterogeneity can be such that either the α-olefin content in a crystalline fraction is 1/10 (one tenth) of the average content or the α-olefin content in an amorphous fraction is up to 5 times the average content. Furthermore, heterogeneous copolymers of this type are advantageously such that their crystalline fractions have a single melting peak at a temperature between about 110° and 130° C. Of their other preferred characteristic properties, the following may be mentioned:

an overall degree of unsaturation between about 0.25 and 0.50 of double bond per 1000 carbon atoms,
a polydispersity index between about 3 and 9 when the copolymer comprises a single α-olefin, between about 6 and 12 when the copolymer comprises at least two α-olefins, and
a number-average molecular weight $M_n$ between about 12,000 and 60,000.

In the context of the present invention, polynorbornene is understood to mean an amorphous polymer or copolymer of bicyclo[2.2.1]-2-heptene and its substituted derivatives, such as described in the Patent U.S. Pat. No. 3,676,390. Of the plasticizers of polynorbornene which are capable of lowering its glass-transition temperature down to the range of rubbers, heavy aromatic oils, naphthenic or paraffinic derivatives of petroleum, having a solidification point below 0° C. and a flashpoint above 180° C., and diesters of phthalic acid such as dioctyl or didodecyl phthalates may be mentioned. These plasticizers can be utilized in pure form or as a mixture.

With the aim of solving the second technical problem mentioned above, the composition according to the invention can moreover comprise an effective amount of a chlorosulfonated polyethylene rubber, the role of the latter being mainly that of a heat stabilizer. The chlorosulfonated polyethylene rubber usable according to the present invention can comprise about 10 to 50% by weight of chlorine and about 0.5 to 3% by weight of sulfur. According to observations made by the applicant company, it seems that the higher the chlorine content in the chlorosulfonated polyethylene rubber the more efficient the protection against thermal aging provided by the presence of the chlorosulfonated polyethylene rubber. A representative example of chlorosulfonated polyethylene rubbers usable according to the present invention consists of the products marketed by E. I. DU PONT DE NEMOURS under the name HYPALON. The efficient amount of chlorosulfonated polyethylene rubber to be used in the compositions according to the invention has to be related to the amount of polynorbornene present in said composition, since that is the constituent principally responsible for thermal degradation. In the context of the present invention, an efficient amount is in general understood to mean an amount between about 2% and 40% by weight relative to the polynorbornene.

In order to improve the balance between properties of the compositions according to the invention, it is advantageous to carry out the crosslinking of polynorbornene, for example by a dynamic vulcanization process. Accordingly, the present invention secondly relates to a thermoplastic composition comprising a mixture of about 20 to 70 parts by weight of crosslinked polynorbornene, about 80 to 30 parts by weight of a crystalline polyolefin and an amount of plasticizer for polynorbornene sufficient for lowering its glass-transition temperature down to the range of rubbers, characterized in that the crystalline polyolefin chosen is a copolymer of ethylene and of at least one α-olefin having 3 to 10 carbon atoms, said copolymer having a relative density between about 0.89 and 0.93, a degree of crystallinity between about 15 and 50% and a flow index between about 0.5 and 15 dg/min. The ethylene/α-olefin copolymer present in the thermoplastic composition according to the invention has already been described above in detailed form in relation to the compositions comprising a non-crosslinked polynorbornene. In the thermoplastic compositions according to the invention, the plasticized crosslinked polynorbornene advantageously takes the form of small dispersed particles, which enables the composition to be processed and used as any other thermoplastic material.

In general, crosslinking systems suited to the vulcanization of diene rubber can be used for the cross-linking of the polynorbornene in the thermoplastic compositions according to the invention. Of the cross-linking agents which are satisfactory for rubbers, vulcanizing agents based on sulfur, peroxide, phenolic resin, nitro maleimide, quinoid and urethane compounds, such as, for example, free sulfur or sulfur-releasing compounds, such as tetramethylthiuram disulfide, thiuram disulfide, benzothiazyl disulfide and dipentamethylenethiuram hexasulfide, or alternatively m-phenylenebis-(maleimide), benzoquinone dioxime, lead peroxide, di(orthotolyl)guanidine, 4,4'-dithiodimorpholine and the like may be mentioned. These vulcanizing agents can advantageously be used in combination with at least one vulcanizing activator or accelerator such as zinc oxide, magnesium oxide, benzothiazolesulfamide, tin chloride, zinc dibutyldithiocarbamate, zinc phenylethyldithiocarbamate, tellurium ethyldithiocarbamate and the like. When free sulfur or a sulfur-releasing compound is used as vulcanizing agent, it is preferable to use a large quantity of vulcanizing activator or accelerator, i.e. for example, a weight of activator or accelerator between about 1 and 3 times the weight of vulcanizing agent.

The constituents of the crosslinking system and especially the vulcanizing agent are used in customary proportions familiar to one skilled in the art for achieving almost complete crosslinking of polynorbornene without however reducing its elasticity to the point where it is no longer rubber-like. In the thermoplastic compositions according to the invention, the polynorbornene is preferably crosslinked to a point where not more than about 10%, preferably not more than about 5%, of polynorbornene can be extracted with a solvent, such as boiling xylene, in which non-crosslinked polynorbornene is completely soluble, as is the ethylene/α-olefin copolymer. This extraction test allows an en route verification of the fact that the ethylene/α-olefin copolymer itself has not been substantially crosslinked, which would have a detrimental effect on the thermoplasticity of the composition.

For certain applications of the compositions according to the invention, their rupture strength and/or resistance to oils can be improved, without at the same time compromising between the favorable balance of properties described above, by replacing part of the ethylene/α-olefin copolymer with an essentially crystalline polymer based on propylene. According to this variation of the invention, up to 60% by weight, and preferably up to 40% by weight, of the ethylene/α-olefin copolymer is replaced with a polymer having a flow index (determined according to ASTM standard D 1238 at 230° C. under 2.16 kg) between 0.3 and 10 dg/min., and comprising at least 80 mol % of units derived from propylene and at most 20 mol % of units derived from a comonomer chosen from ethylene and α-olefins having 4 to 12 carbon atoms. Said polymer is crystalline in form and, when composed solely of units derived from propylene, preferably isotactic.

The thermoplastic compositions according to the invention can moreover comprise an effective amount of a chlorosulfonated polyethylene rubber, such as described above in relation to the compositions comprising a non-crosslinked polynorbornene.

The properties of the compositions according to the invention can be modified in an advantageous manner for the requirements of certain specific uses by adding conventional ingredients, such as:

white pigments (titanium oxide) or colored pigments, coupling agents, such as silanes or titanates,
anti-degradation agents, such as, for example, the zinc salt of mercaptobenzimidazole,
stabilizers, such as, for example, polymerized 2,2,4-trimethyl-1,2-dihydroquinoline,
processing aids, such as aliphatic long-chain amines, salts of stearic acid and the like,
fillers in powder form, such as carbon black, silica, kaolin, alumina, clay, aluminosilicate, talc, carbonate, and
lubricants, such as stearic acid.

The addition of fillers in powder form has in particular the effect of improving the rupture strength and in certain cases the elongation at break of the thermoplastic composition according to the invention. The amount of filler which can be incorporated in the composition can reach up to about 150 parts per 100 parts by weight of the polynorbornene, this amount being of course variable according to the nature of the filler.

Finally, for applications in which a high resistance to ozone and/or to thermal aging is desired, the compositions according to the invention can comprise an olefinic elastomer, which serves as partial replacement of the polynorbornene in such a manner that the sum of the ethylene/α-olefin copolymer, polynorbornene and the olefinic elastomer is equal to 100 parts by weight. As olefinic elastomer usable in the compositions according to the invention, especially an ethylene terpolymer with at least one α-olefin having 3 to 6 carbon atoms and at least one diene may be mentioned. More specifically, ethylene/propylene/diene terpolymers are preferred in which the diene is selected from linear or cyclic, conjugated or non-conjugated dienes, such as, for example, butadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, 2-alkyl-2,5-norbornadienes, 5-ethylidene-2-norbornene, 5-(2-propenyl)-2-norbornene, 5-(5-hexenyl)-2-norbornene, 1,5-cyclooctadiene,bicyclo[2.2.2]octa-2,5-diene,cyclopentadiene, 4,7,8,9-tetrahydroindene and isopropylidene tetrahydroindene. Such elastomeric terpolymers usable according to the present invention in general comprise between about 15 and 60 mol % of units derived from propylene and between about 0.1 and 20 mol % of units derived from the diene.

The proportion of olefinic elastomer usable in the compositions according to the invention is in general such that it replaces up to one-third of the weight of the polynorbornene present. Thus, a composition comprising 30 parts of ethylene/α-olefin copolymer can comprise up to about 23 parts by weight of olefinic elastomer and consequently at least about 47 parts by weight of polynorbornene.

The thermoplastic compositions according to the invention in which the polynorbornene is crosslinked are preferably prepared by dynamic vulcanization, i.e. by kneading a mixture of polynorbornene, plasticizer, ethylene/α-olefin copolymer and a crosslinking system (as defined above) at a temperature sufficiently high and over a period sufficiently long for crosslinking the polynorbornene. The kneading can be carried out in a conventional apparatus, such, for example, a Banbury kneader, a Brabender kneader, a Rheocord kneader or an extruder, at a temperature between about 110° and 220° C. over a period between about 3 and 15 minutes, this period being less long the higher the temperature. Before this kneading step, the mixture can first be homogenized in an internal mixer at a moderate temperature between about 60° and 120° C.

The compositions according to the invention can be used for the manufacture of finished products and industrial articles by the extrusion, injection-molding and compression-molding techniques.

They can be in particular extruded on extruders of the same type as the ones currently used for polyolefins, i.e. those having a screw length/diameter ratio of in general between about 18 and 28 and a compression ratio of preferably close to 3.0. The temperature profile displayed along the screw is in general quite flat, the temperature difference between the inlet and die being about 10° C. to 20° C. The temperature of the composition in the extruder (temperature of the composition) can be between about 150° C. and 220° C., preferably between 160° C. and 180° C. These extruders are equipped with profiled dies (for example profiles from industrial patterns). The rate of extrusion is between about 15 and 50 meters per minute, and the extrudate undergoes virtually no strageing upon leaving; it is cooled in a water bath and transferred onto a drawing bench whose rate is in general between about 100% and 110% of the rate of extrusion.

The compositions according to the invention can also be injected by means of injection-molding apparatuses of the same type as those currently used for polyethylene of high and low density and polypropylene. The temperature of the composition in the injection-molding machine, which is a function of the proportion of plasticizer in the composition, is in general between about 120° C. and 200° C. The higher the proportion of plasticizer, the lower this temperature. It is generally appropriate to use an injection pressure much higher than the operating pressure, so that the fluidity of the composition during the injection is increased. For example, it is possible to use an injection pressure of 700 bar when the operating pressure is 150 bar. The speed of the plasticizing screw can usually reach about 100 to 200 revolutions per minute. Depending on the desired rate of injection, the temperature of the mold can be chosen between about −10° C. and +40° C.

Concrete applications of the compositions according to the invention comprise especially flexible tubes, seals for the construction and automobile industries, protective bellows for the automobile industry, injection-molded articles, such as solid wheels for the toy industry, and the like.

The examples below are given for non-limiting illustration of the present invention.

EXAMPLE 1

Comparative

In a first step, polynorbornene is formulated together with a plasticizer, a filler, an anti-degradation agent, a vulcanizing agent, a pigment and a lubricant in an internal mixer rotating at 100 rpm for 6 minutes, controlled at 80° C., and the formulation obtained is then made into a sheet by passing it over a cylindrical mixer controlled at 60° C. to which a vulcanizing accelerator is added. In a second step, a crystalline polyolefin is added to the rubber-like composition, and the mixture is transferred to a Brabender kneader rotating at 90 rpm at a temperature of 180° C. over a period of 8 minutes. The resulting composition is recovered and compression-molded to give plates of 2.5 mm, on which the following properties are measured:

Shore A hardness determined according to ASTM Standard D 2240, elongation at break, expressed in % and determined according to ASTM Standard D 412, modulus of 100% elongation, expressed in MPa and determined according to ASTM Standard D 412, elongation set, expressed in % and determined according to ASTM Standard D 412 (after an elongation of 100%).

Finally, the compression set (CS) at 70° C. over a period of 22 hours is measured on test bars of 12.5 mm compressed by 25%, determined according to ASTM Standard D 395 and expressed in %. In this comparative example:

the crystalline polyolefin is a polyethylene according to the teaching of the U.S. Pat. No. 4,203,884, having a relative density of 0.962 and a flow index of 5.3 dg/min., marketed by SOLVAY under the name ELTEX A 1050 F, the polynorbornene used is marketed by the Applicant under the name NORSOREX, the plasticizer is a paraffinic oil of a flash-point equal to 225° C. and a solidification point equal to −10° C., marketed by EXXON under the name FLEXON 876, the powdered filler is calcined kaolin, the anti-degradation agent is the zinc salt of mercaptobenzimidazole marketed by SAFIC-ALCAN under the name ZMBI, the vulcanizing agent is a phenolic resin of the formula:

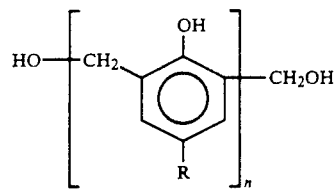

in which n is 4 or 5 and R denotes an alkyl radical, marketed by SCHENECTADY under the name SP 1045, the heat stabilizer is an elastomer of chlorosulfonated polyethylene marketed by DU PONT DE NEMOURS under the name HYPALON 20, the vulcanizing accelerator is a mixture of equal weights of stannous chloride $SnCl_2 \times 2\ H_2O$ and zinc oxide, the pigment is titanium oxide, and the lubricant is stearic acid.

The amounts by weight of the various ingredients of the composition are shown in the table below, along with the results of the measurements of the properties carried out as described above.

EXAMPLES 2 to 5

The procedure of Example 1 is repeated under the same conditions and using the same ingredients with the exception of the nature of the crystalline polyolefin, and different compositions whose properties are shown in Table I below are prepared.

The crystalline polyolefin used in Examples 2 and 4 is an ethylene/1-butene copolymer having a relative density of 0.910 and a flow index of 1 dg/min, a crystalline melting peak of 116° C. and a degree of crystallinity of 30%, marketed under the name NORSOFLEX FW 1600. The crystalline polyolefin used in Examples 3 and 5 is a ethylene/1-butene/propylene terpolymer having a relative density of 0.900 and a flow index of 7.5 dg/min., a crystalline melting peak of 113° C. and a degree of crystallinity of 20%, marketed under the name NORSOFLEX MW 1920.

TABLE I

| | Example | | | | |
|---|---|---|---|---|---|
| | 1 | 2 | 3 | 4 | 5 |
| Polynorbornene | 55.4 | 55.4 | 55.4 | 68.7 | 68.7 |
| Plasticizer | 83.2 | 83.2 | 83.2 | 103 | 103 |
| Filler | 22.2 | 22.2 | 22.2 | 27.5 | 27.5 |
| Anti-degradation agent | 1.1 | 1.1 | 1.1 | 1.4 | 1.4 |
| Vulcanizing agent | 6.1 | 6.1 | 6.1 | 7.4 | 7.4 |
| Stabilizer | 6.0 | 6.0 | 6.0 | 7.5 | 7.5 |
| Pigment | 5.5 | 5.5 | 5.5 | 6.9 | 6.9 |
| Lubricant | 0.6 | 0.6 | 0.6 | 0.7 | 0.7 |
| Vulcanizing accelerator | 5.0 | 5.0 | 5.0 | 6.1 | 6.1 |
| Polyolefin | 44.6 | 44.6 | 44.6 | 31.3 | 31.3 |
| Shore A hardness | 78 | 61 | 52 | 51 | 45 |
| Elongation at break | 190 | 430 | 350 | 360 | 330 |
| Modulus of 100% elongation | 7.8 | 1.8 | 0.7 | 1.2 | 0.5 |
| Elongation set | 26 | 11 | 6 | 9 | 8 |
| Compression set | 49 | 45 | 40 | 37 | 32 |

EXAMPLE 6

Comparative

Repeating the same preparation process as in Example 1, a composition is formulated in which:
 the polyolefin and the polynorbornene used are the same as in Example 1,
 the plasticizer is a naphthenic oil marketed by TEXACO under the name DEALEN 25,
 the filler is carbon black marketed under the name black 990 MT (Class 9 according to ASTM Standard D 1765),
 the anti-degradation agent is a mixture of equal weights of the zinc salt of mercaptobenzimidazole marketed by SAFIC-ALCAN under the name ZMBI and of polymerized 2,2,4-trimethyl-1,2-dihydroquinoline marketed by MONSANTO under the name FLECTOL H,
 the lubricant is stearic acid,
 the vulcanizing agent is a mixture of equal weights of tetramethylthiuram disulfide and 4,4'-dithio-dimorpholine,
 the vulcanizing accelerator is a mixture of zinc dibutyldithiocarbamate, zinc phenylethyldithiocarbamate, tellurium ethyldithiocarbamate and zinc oxide in the weight proportions of 2/0.5/1/3,
 the stabilizer is a product marketed by BAYER under the name VULKALENT E,
 the elastomer is a terpolymer marketed by GOODRICH under the reference EP 5875, which comprises 70% by weight of ethylene, 22% by weight of propylene and 8% by weight of diene and has a Mooney viscosity of 50 at 125° C.

The amounts by weight of the various ingredients of the composition are shown in Table II below, along with the results of the measurements of the properties carried out as described above.

EXAMPLES 7 to 10

The procedure of Example 6 is repeated under the same conditions and using the same ingredients with the exception of the nature of the crystalline polyolefin, and different compositions whose properties are shown in Table II below are prepared.

The crystalline polyolefin used in Examples 7 and 9 is the same as that used in Examples 2 and 4. The crystalline polyolefin used in Example 8 is the same as that used in Example 3. The crystalline polyolefin used in Example 10 is an ethylene/1-octene copolymer having a relative density of 0.918 and a flow index of 5.4 dg/min and a degree of crystallinity of 35%, marketed by DSM under the name STAMYLEX 1046.

TABLE II

| | Example | | | | |
|---|---|---|---|---|---|
| | 6 | 7 | 8 | 9 | 10 |
| Polynorbornene | 38 | 42 | 42 | 57 | 38 |
| Plasticizer | 85 | 93 | 93 | 128 | 85 |
| Filler | 38 | 41 | 41 | 57 | 38 |
| Anti-degradation agent | 0.8 | 0.8 | 0.8 | 1.6 | 0.8 |
| Vulcanizing agent | 1.2 | 1.2 | 1.2 | 1.7 | 1.2 |
| Lubricant | 0.2 | 0.2 | 0.2 | 0.3 | 0.2 |
| Vulcanizing accelerator | 2.4 | 2.6 | 2.6 | 3.7 | 2.4 |
| Stabilizer | 0.4 | 0.4 | 0.4 | 0.6 | 0.4 |
| Polyolefin | 52 | 48 | 48 | 29 | 52.5 |
| Elastomer | 9.5 | 10 | 10 | 14 | 9.5 |
| Shore A hardness | 78 | 50 | 42 | 34 | 62 |
| Elongation at break | 320 | 420 | 400 | 370 | 440 |
| Modulus of 100% elongation | 5.1 | 0.7 | 0.5 | 0.4 | 1.8 |
| Elongation set | 13 | 10 | 10 | 8 | 16 |
| Compression set | 45 | 40 | 44 | 34 | 38 |

EXAMPLE 11

The procedure of Example 7 is repeated under the same conditions and using the same ingredients with the exception of the absence of elastomer, and a composition whose properties are shown in Table III below is prepared. Apart from the properties already measured for Examples 6 to 10, the following are measured:
 rupture strength, expressed in MPa and determined according to ASTM Standard D 412,
 the degree of swelling by volume after a residence time of 168 hours at 100° C. in the oil referred to as ASTM 3, expressed in percent and determined according to ASTM Standard D 471.

EXAMPLE 12

The procedure of Example 11 is repeated under the same conditions and using the same ingredients, except that a random copolymer comprising about 91% by weight of propylene and about 9% by weight of ethylene and having a flow index of 2 dg/min is added (determined according to ASTM Standard D 1238 at 230° C. under 2.16 kg), marketed by SOLVAY under the name ELTEX PKL 104, and a composition whose properties are shown in Table III below is prepared.

TABLE III

|  | EXAMPLE | |
|---|---|---|
|  | 11 | 12 |
| Polynorbornene | 51 | 47 |
| Plasticizer | 114 | 85 |
| Filler | 51 | 47 |
| Anti-degradation agent | 0.5 | 0.5 |
| Vulcanizing agent | 1.5 | 1.4 |
| Lubricant | 0.5 | 0.5 |
| Vulcanizing accelerator | 3.3 | 3.0 |
| Stabilizer | 0.5 | 0.5 |
| Norsoflex FW 1600 | 49 | 41 |
| Eltex PKL 104 | 0 | 12 |
| Shore A hardness | 55 | 60 |
| Elongation at break | 370 | 320 |
| Modulus of 100% elongation | 2.0 | 2.6 |
| Elongation set | 11 | 12 |
| Compression set | 32 | 35 |
| Rupture strength | 4.4 | 7.0 |
| Swelling by volume | >200* | 120 |

*Test specimen destroyed

We claim:

1. Composition comprising a mixture of 20 to 70 parts by weight of polynorbornene, 80 to 30 parts by weight of a crystalline polyolefin and a quantity of plasticizer for polynorbornene sufficiently high for lowering its glass-transition temperature down to the range of rubbers, wherein said crystalline polyolefin is a copolymer of ethylene and of at least one α-olefin having 3 to 10 carbon atoms, said copolymer having a relative density between 0.89 and 0.93, a degree of crystallinity between 15 and 50% and a flow index between 0.5 and 15 dg/min.

2. Thermoplastic composition comprising a mixture of 20 to 70 parts by weight of crosslinked polynorbornene, 80 to 30 parts by weight of a crystalline polyolefin and a quantity of plasticizer for polynorbornene sufficient for lowering its glass-transition temperature down to the range of rubbers, wherein said crystalline polyolefin is a copolymer of ethylene and of at least one α-olefin having 3 to 10 carbon atoms, said copolymer having a relative density between 0.89 and 0.93, a degree of crystallinity between 15 and 50% and a flow index between 0.5 and 15 dg/min.

3. Composition according to either of claims 1 and 2, wherein said copolymer is a copolymer of particularly pronounced macromolecular heterogeneity, i.e. one in which the α-olefin content can vary considerably, depending on the crystalline or amorphous fractions in which it is measured, from the average content.

4. Thermoplastic composition according to claim 1 to wherein said compositions further comprises at least one olefinic elastomer which serves as partial replacement of the polynorbornene in such a manner that the sum of the ethylene/α-olefin copolymer, polynorbornene and the olefinic elastomer is equal to 100 parts by weight.

5. Thermoplastic composition according to claim 4, wherein said olefinic elastomer is a terpolymer of ethylene, of at least one α-olefin having 3 to carbon atoms and of at least one diene.

6. Thermoplastic composition according to one of claims 4 and 5, wherein said olefinic elastomer is an ethylene/propylene/diene terpolymer comprising 15 to 60 mol % of units derived from propylene and 0.1 to 20 mol % of units derived from the diene.

7. Thermoplastic composition according to one of claim 5, wherein said diene is chosen from linear or cyclic, conjugated or non-conjugated dienes.

8. Thermoplastic composition according to claim 4, wherein said olefinic elastomer is used in a proportion of up to one third of the weight of polynorbornene.

9. Thermoplastic composition according to claim 3, wherein said α-olefin content in the copolymer varies, depending on the crystalline or amorphous fractions, between 1/10 of the average content and 5 times the average content.

10. Thermoplastic composition according to claim 3, wherein said ethylene/α-olefin copolymer has a single melting peak at a temperature between 110° and 130° C.

11. Thermoplastic composition according to claim 3 wherein said ethylene/α-olefin copolymer comprises a single α-olefin and has a polydispersity index between 3 and 9.

12. Thermoplastic composition according to claim 3 wherein the number-average molecular weight of the ethylene/α-olefin copolymer is between 12,000 and 60,000.

13. Thermoplastic composition according to claim 2, wherein said polynorbornene is crosslinked up to the point where no more than 10% of polynorbornene can be extracted with a solvent.

14. Thermoplastic composition according to claim 3, wherein said composition further comprises at least one additive chosen from white or colored pigments, coupling agents, anti-degradation agents, stabilizers, processing aids, powdered fillers and lubricants.

15. Thermoplastic composition according to claim 14, wherein said additive is a powdered filler used in an amount of 150 parts per 100 parts by weight of polynorbornene.

16. Thermoplastic composition according to one of claim 2 wherein said composition has:
   a Shore A hardness not exceeding 65,
   an elongation at break which is not less than 250%,
   a modulus of 100% elongation which is not higher than 6 MPa, and
   a compression set at 70° C over a period of 22 hours according to ASTM Standard D 395 not exceeding 45%.

17. Process for the preparation of a thermoplastic composition according to claim 2, comprising kneading a mixture of polynorbornene, plasticizer, ethylene/α-olefin copolymer and a crosslinking system at a temperature sufficiently high and over a period sufficiently long for crosslinking the polynorbornene.

18. Process according to claim 17, wherein said kneading is carried out at a temperature between 110° and 220° C. over a period between 3 and 15 minutes.

19. Thermoplastic composition according to claim 2, further comprising an effective quantity of a chlorosulfonated polyethylene rubber.

20. Composition according to claim 19, wherein said chlorosulfonated polyethylene rubber comprises 10 to 50% by weight of chlorine and 0.5 to 3% by weight of sulfur.

21. Composition according to one of claims 19 and 20, wherein the quantity of chlorosulfonated polyethylene rubber is between 2% and 40% by weight, relative to the quantity of polynorbornene.

22. Thermoplastic composition according to claim 2 wherein up to 60% by weight of the ethylene/α-olefin copolymer is replaced with a polymer having a flow index (determined according to ASTM Standard D 1238 at 230° C. under 2.16 kg) between 0.3 and 10 dg/min., and comprising at least 80 mol % of units derived from propylene and at most 20 mol % of units derived from a comonomer chosen from ethylene and α-olefins having 4 to 12 carbon atoms.

* * * * *

UNITED STATES PATENT AND TRADEMARK OFFICE
CERTIFICATE OF CORRECTION

PATENT NO.  : 5,266,626

DATED       : November 30, 1993

INVENTOR(S) : Marius HERT et al.

It is certified that error appears in the above-identified patent and that said Letters Patent is hereby corrected as shown below:

On the title page:

In the Abstract, line 3, delete "polyolefine" and insert --polyolefin--;

lines 3-4, delete "plastifier" and insert --plasticizer--;

line 7, delete "α-olefine" and insert --α-olefin--; and line 8, delete "polyolefine" and insert --polyolefin--.

Claim 4, column 11, line 50, delete second occurrence of "to".

Claim 7, column 11, line 66, delete "one of".

Claim 16, column 12, line 32, delete "one of".

Signed and Sealed this

Tenth Day of May, 1994

Attest:

BRUCE LEHMAN

*Attesting Officer*    Commissioner of Patents and Trademarks